US007519033B2

(12) United States Patent
Soomro

(10) Patent No.: US 7,519,033 B2
(45) Date of Patent: Apr. 14, 2009

(54) SYSTEM AND METHOD FOR MEASUREMENT REPORT TIME STAMPING TO ENSURE REFERENCE TIME CORRECTNESS

(75) Inventor: Amjad Soomro, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 584 days.

(21) Appl. No.: 10/556,001

(22) PCT Filed: May 3, 2004

(86) PCT No.: PCT/IB2004/001466

§ 371 (c)(1),
(2), (4) Date: Nov. 8, 2005

(87) PCT Pub. No.: WO2004/100450

PCT Pub. Date: Nov. 18, 2004

(65) Prior Publication Data

US 2007/0002806 A1 Jan. 4, 2007

Related U.S. Application Data

(60) Provisional application No. 60/469,194, filed on May 9, 2003, provisional application No. 60/503,849, filed on Sep. 17, 2003.

(51) Int. Cl.
*H04L 12/26* (2006.01)

(52) U.S. Cl. ............ 370/338; 455/67.11; 455/524; 455/423; 455/502; 370/345; 370/350; 370/332

(58) Field of Classification Search ............ 370/310, 370/328, 277–278, 332, 345–350; 455/67.11, 455/67.14, 115.1, 524, 502, 507, 41.2, 423
See application file for complete search history.

(56) References Cited

U.S. PATENT DOCUMENTS 5,966,656 A * 10/1999 Elkin et al. ............ 455/421

(Continued)

FOREIGN PATENT DOCUMENTS

WO    WO 03/094564 A1    11/2003

OTHER PUBLICATIONS

"Transmitter Power control (TPC) and Dynamic Frequency Selection (DFS) Joint Proposal for 802.11h WLAN", by S. Choi et al, May 2001.
"Proposed Text for Radio Measurement Requests and Reports", by Daryl Kaiser, Mar. 13, 2003.
Amendment 5: Spectrum and Transmit Power Management Extensions in the 5 GHz band in Europe, XP 002292634, (Noted the Date is: Oct. 14, 2003).

*Primary Examiner*—Kamran Afshar
(74) *Attorney, Agent, or Firm*—Larry Liberchuk

(57) ABSTRACT

A system and method is provided that resolves a possible ambiguity in WLAN measurement reports by having a measuring entity include timer values in returned measurement reports. The time a measurement was requested to be performed and the actual time it was done by a measuring entity can be compared by the receiver to ensure that no ambiguities occurred.

13 Claims, 6 Drawing Sheets

U.S. PATENT DOCUMENTS

| | | |
|---|---|---|
| 5,987,306 A | 11/1999 | Nilsen |
| 6,298,233 B1 | 10/2001 | Souissi |
| 6,345,043 B1 | 2/2002 | Hsu |
| 6,385,173 B1 | 5/2002 | Lindskog |
| 2005/0054294 A1* | 3/2005 | Khun-Jush et al. ......... 455/63.1 |
| 2007/0002757 A1* | 1/2007 | Soomro et al. .............. 370/338 |

* cited by examiner

US 7,519,033 B2

SYSTEM AND METHOD FOR MEASUREMENT REPORT TIME STAMPING TO ENSURE REFERENCE TIME CORRECTNESS

CROSS REFERENCE TO RELATED APPLICATION

This application claims the benefit of U.S. provisional application Ser. No. 60/469,194 filed May 9, 2003 and U.S. provisional application Ser. No. 60/503,849 filed Sep. 17, 2003, both of which are incorporated herein in whole by reference.

The present invention relates to Local Area Network communication, and more particularly to a system and method for time stamping a measurement report that ensures correctness of a reference time.

In general, there are two variants of WLANs: infrastructure-based and ad hoc-type. In the former network, communication typically takes place only between the wireless nodes, called stations (STA), and an access point (AP) that is also a STA., which together form a basic service set (BSS). Communication takes place directly between wireless nodes (STAs) which form an independent basic service set (IBSS) in the ad hoc-type network.

In a WLAN, measurements are requested and reported between Radio Measurement-capable STAs. Measurements on non-serving channels are dedicated measurements, requiring the measuring STA to interrupt its normal operation, switch channels and acquire radio measurements. Measurements on a serving channel are executed by a STA as concurrent measurements. While a Measurement-capable STA is responsible for decoding and interpreting each Measurement Report Frame and assessing its impact on its own performance, the execution of some Measurement requests is optional and may be ignored by a receiving STA if its execution would significantly degrade the STA's performance.

A STA may measure one or more channels itself or a STA may request other STAs in the same BSS or IBSS to measure one or more channels on its behalf. When requesting other STAs to measure one or more channels, a STA employs a Measurement Request Frame specifying therein at least one Measurement Request element.

The Institute of Electrical and Electronics Engineers (IEEE) 802.11-1999 standard is a protocol standard for wireless LANs (WLANs) that focuses on the media access control (MAC) and physical (PHY) layers and is hereby incorporated by reference as if fully set forth herein. In the IEEE 802.11(h) and IEEE 802.11(k) draft supplements to this standard, which are hereby incorporated by reference as if fully set forth herein, measurement requests include a time reference specifying when a requested measurement is to be started. For example, as illustrated in FIG. 1A, a Measurement Offset parameter 100 and an Activation Delay parameter 101 together specify the reference time in IEEE TGh and TGk. Activation Delay is the measurement activation delay in number of target beacon transmission times (TBTTs) and Measurement Offset is the measurement offset in timer units (TUs). FIG. 1B illustrates the measurement requests allowed.

Due to channel conditions, more than one attempt may be made to communicate a measurement request to a destination station (STA). At the receiving STA, if more than one copy of the same measurement request is received, then the STA discards the most recently received duplicate packets. This is according to the protocol specified in the IEEE 802.11 standard.

The discard of duplicate frames at the receiving STA, according to the IEEE 802.11 protocol, may result in the requesting and receiving STA each having a different reference beacon from which each references measurement start times. For example, if a measurement request is intended to be transmitted in one beacon period and, due to channel conditions, the recipient STA receives the frame correctly while its ACK is not received back at the transmitting STA, and if subsequently the measurement request is successfully transmitted in another beacon period, then, at the transmitting and receiving stations the reference beacons differ.

Embodiments of the present invention provide a method and system that resolves the ambiguity in a WLAN measurement report by including timer values in measurement reports. The time a measurement is requested to be performed and the actual time the measurement is made can then be compared by the requestor to ensure that no ambiguity occurs. In an embodiment of the present invention for an IEEE 802.11 WLAN, time synchronization function (TSF) timer values are included in measurement reports.

In a preferred embodiment, a Measurement Report Frame and element are modified to contain a field with an absolute time reference. For an IEEE 802.11 WLAN the absolute time reference is the value of TSF time (or part thereof) when requested measurements start. In all embodiments, comparison is made between the intended (requested) time to start the measurements and the time measurements actually started to ensure that no protocol ambiguities occurred.

In the following description, by way of explanation rather than limitation, specific details are set forth such as the particular architecture, interfaces, techniques, etc., in order to provide a thorough understanding of the present invention. However, it will be apparent to those skilled in the art that the present invention may be practiced in other wireless network embodiments that depart from these specific details.

Figure 2A:
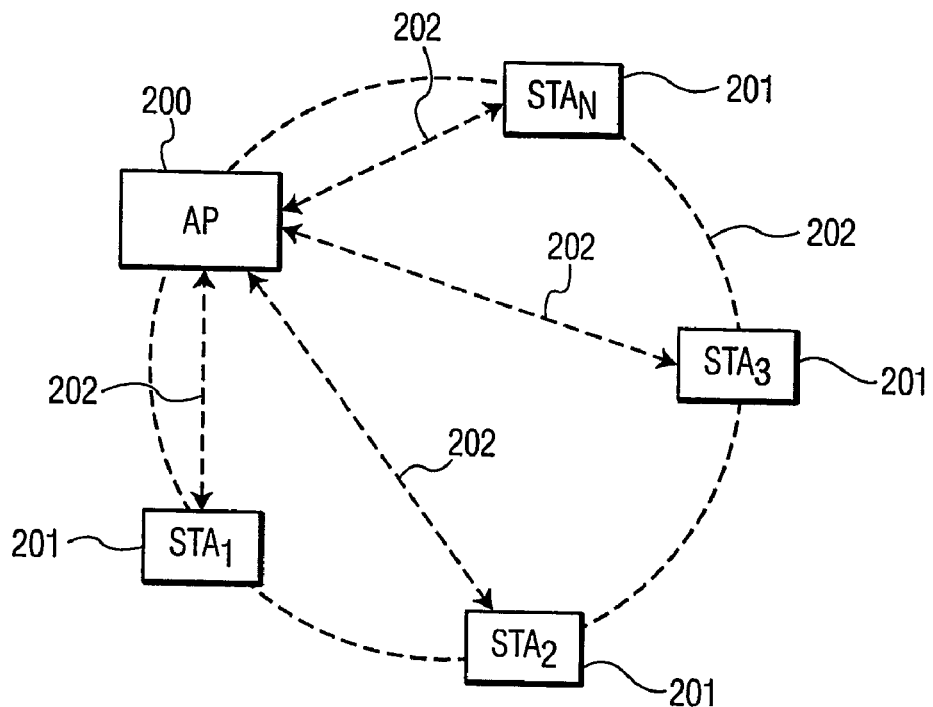
FIG. 2A is a simplified block diagram illustrating the architecture of a basic service set (BSS) wireless communication system whereto embodiments of the present invention are to be applied.
Figure 2B:
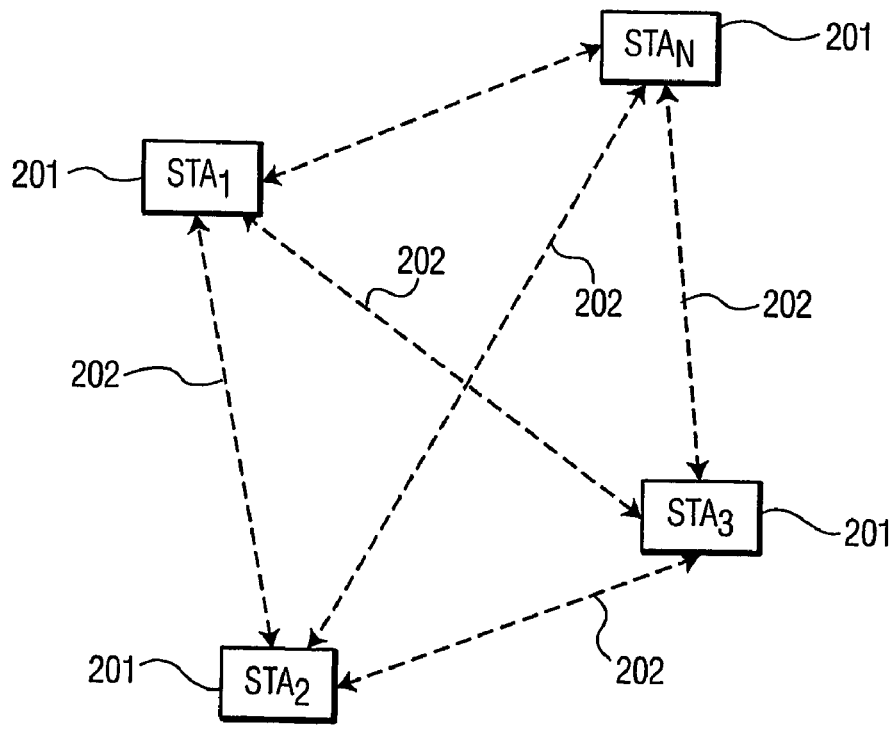
FIG. 2B is a simplified block diagram illustrating the architecture of an ad hoc-type independent basic service set (IBSS) wireless communication system whereto embodiments of the present invention are to be applied.

FIG. 2A is a representative infrastructure basic service set (BSS) wireless network whereto embodiments of the present invention are to be applied. As shown in FIG. 2A, an access point (AP) 200 is coupled to a plurality of mobile stations ($STA_i$) 201, which, through wireless links 202 are communicating with each other and the AP via a plurality of wireless channels. A key principle of the present invention is to provide a mechanism to time stamp reports of measurements taken by the STA$_i$ 201 so that protocol ambiguities can be avoided should they occur and, therefore, makes it possible to employ corrective actions after the fact. It should be noted that the network shown in FIG. 2 is small for purposes of illustration. In practice most networks would include a much larger number of mobile STA$_i$ 201. FIG. 2B is a representative ad hoc-type independent basic service set (IBSS) wireless network whereto embodiments of the present invention are to be applied. As shown in FIG. 2B, a plurality of mobile stations (STA$_i$) 201 communicate with each other through wireless links 202 without any AP.

Figure 3:
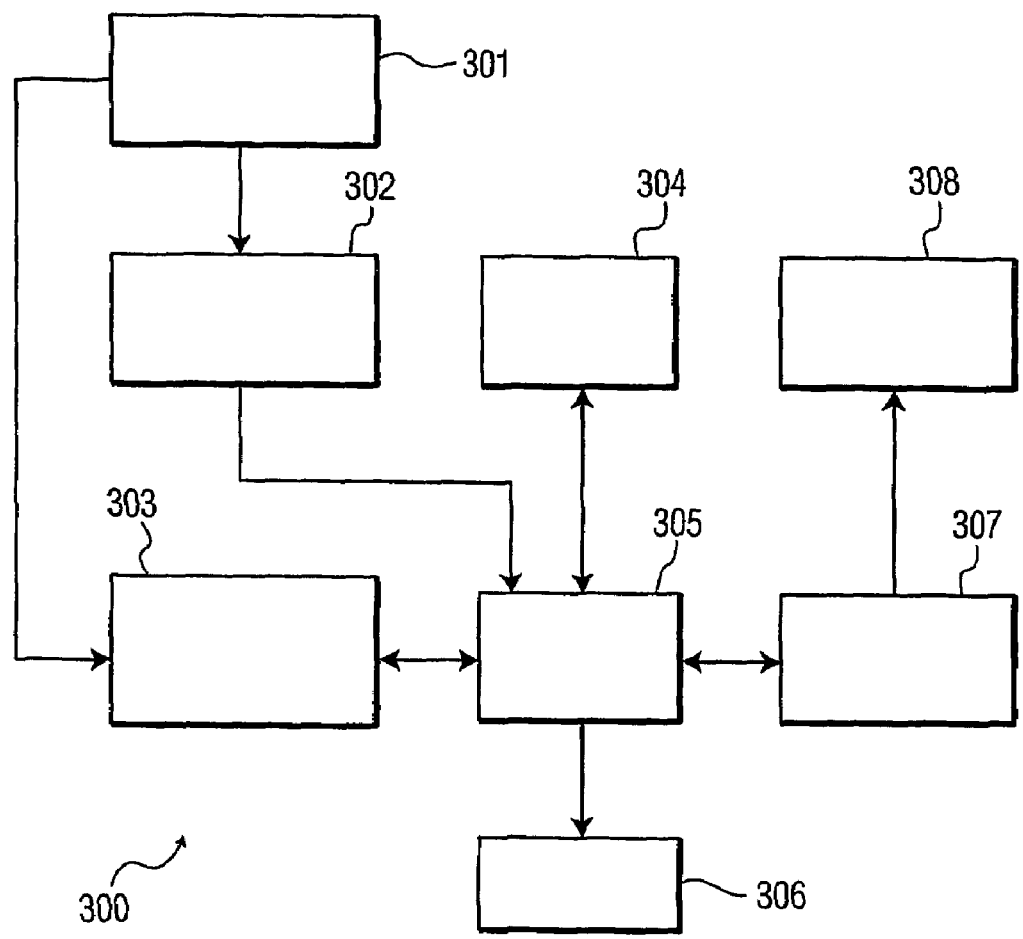
FIG. 3 illustrates a simplified block diagram of an access point (AP) and each station (STA) within a particular basic service set (BSS) or independent basic service set (IBSS) according to an embodiment of the present invention.

Referring to FIG. 3, the AP 200 and each STA$_i$ 201 within the WLAN of FIGS. 2A and B may include a system with an architecture that is illustrated in the block diagram of FIG. 3. Both the AP 200 and each STA$_i$ 201 may include a receiver 301, a demodulator 302, a measurement circuit 303, a memory 304, a control processor 305, a timer 306, a modulator 307, and a transmitter 308. The exemplary system 300 of FIG. 3 is for descriptive purposes only. Although the description may refer to terms commonly used in describing particular mobile stations, the description and concepts equally apply to other processing systems, including systems having architectures dissimilar to that shown in FIG. 3.

Figure 1A:
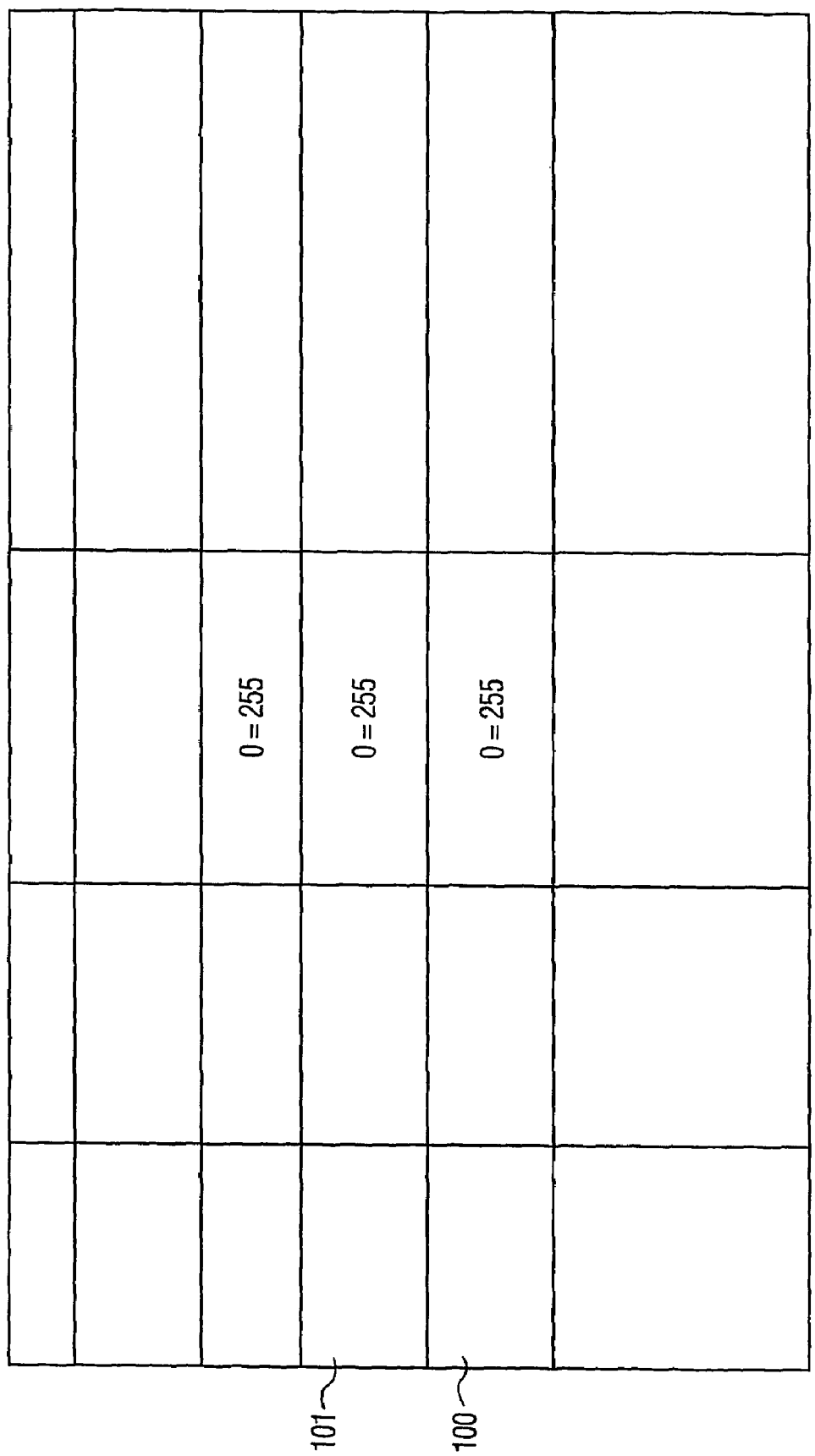
FIG. 1A illustrates parameters of a service primitive that requests the transmission of a measurement request to a peer entity in a WLAN.
Figure 1B:
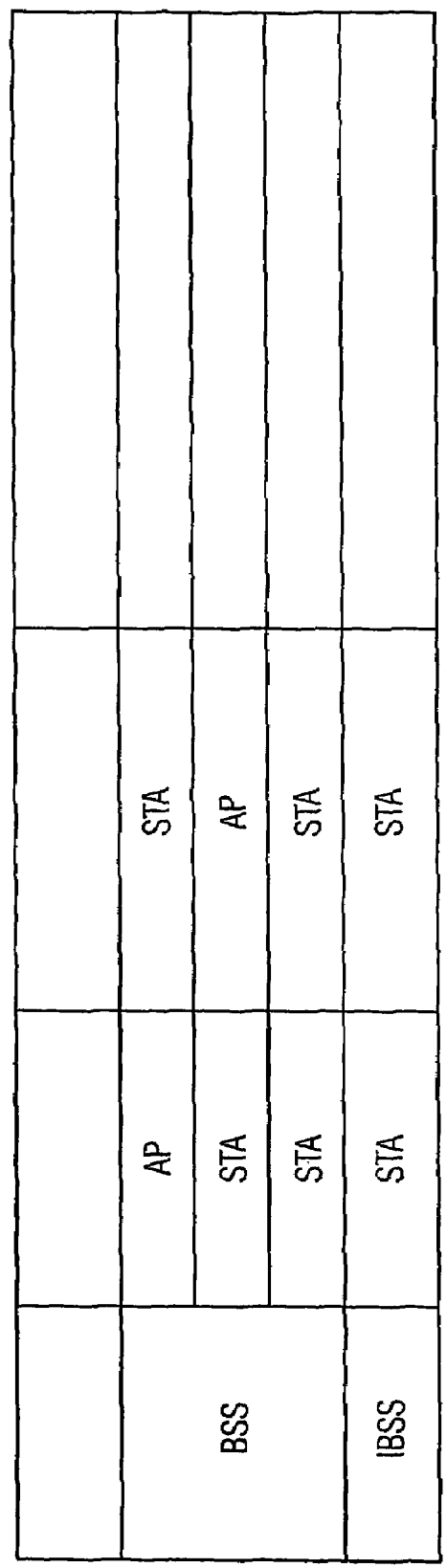
FIG. 1B illustrates the measurement requests allowed in a WLAN.

In a preferred embodiment, the receiver 301 and the transmitter 308 are coupled to an antenna (not shown) to convert received measurement reports and transmit desired measurement requests into corresponding digital data via the demodulator 302 and the modulator 307, respectively. The measurement acquisition circuit operates under the control of the processor 305 to the process received Measurement Report Frames comprising measurements and corresponding time stamps or to make requested or periodic measurements (autonomously) in which measurements are conveyed along with corresponding time stamps in Measurement Report Frames. FIG. 1B shows possible requestor and measurer combinations for both IBSS and BSS IEEE 802.11 WLANs embodiments of the present invention. The timer 306 is used to set the time stamp in the Measurement Report Frames that indicates the start time of the measurement being reported.

Figure 4:
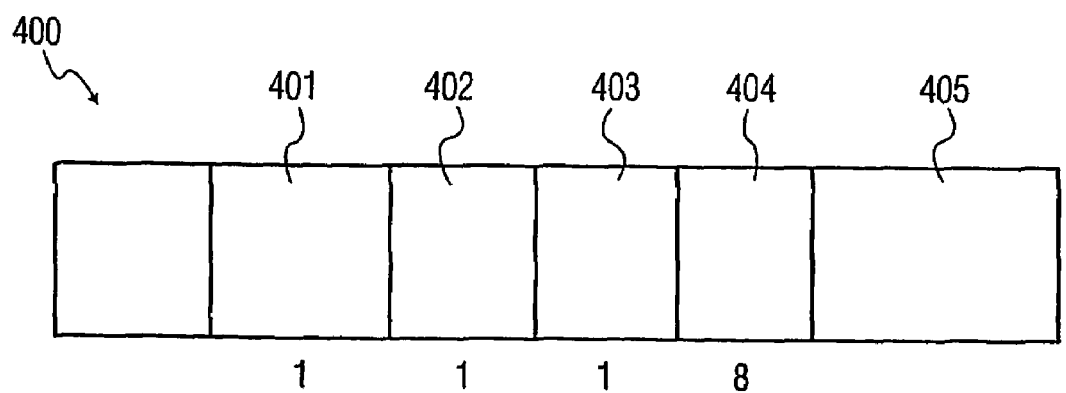
FIG. 4 illustrates a Measurement Report Frame format according to an embodiment of the present invention.
Figure 5A:
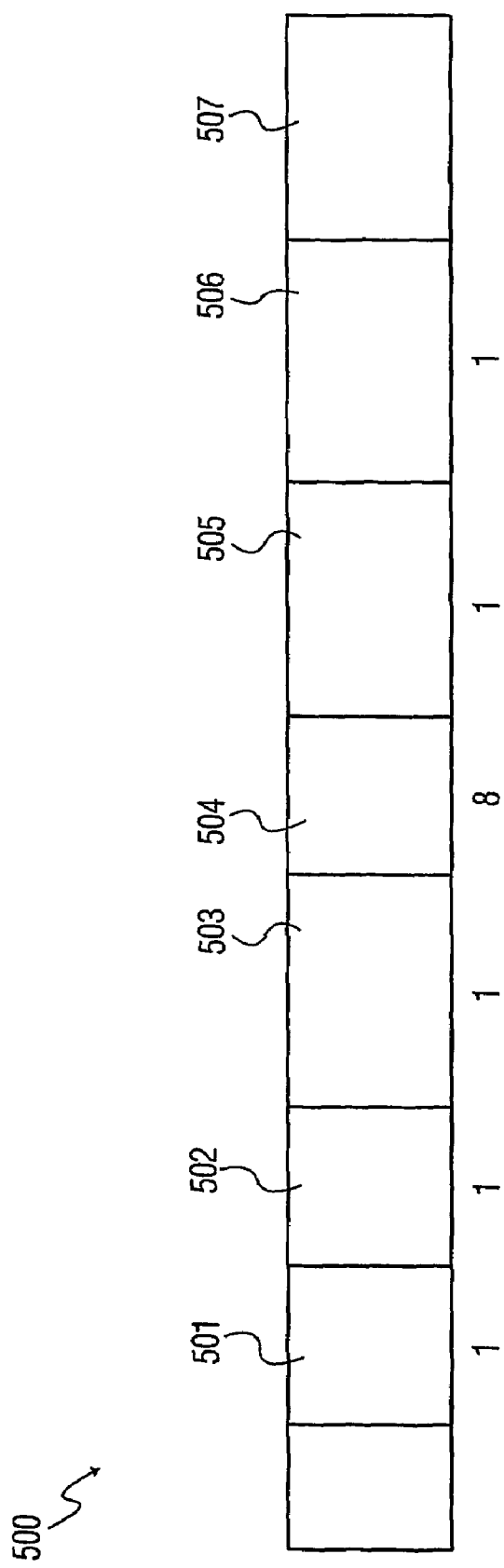
FIG. 5A illustrates a Measurement Report Element format according to an embodiment of the present invention.

FIG. 4 illustrates a format for a Measurement Report Frame body 400 according to a preferred embodiment of the present invention. In an IEEE 802.11 WLAN embodiment of the present invention, the Measurement Report Frame body 400 uses an Action frame body format and is transmitted by a STA 201 in response to a Measurement Request Frame or by a STA 201 autonomously providing measurement information. In all embodiments, the Category field 401 is set equal to a value indicating a Radio Measurement category or Spectrum Management category. The Action field 402 is set equal to a value indicating a Measurement Report is contained therein. The Dialog Token field 403 is set equal to a value in a corresponding Measurement Request Frame. If the Measurement Report Frame 400 is not being transmitted in response to a Measurement Request Frame then the Dialog Token field 402 is set equal to zero. In a preferred embodiment, at least one of (1) the Time Stamp field 404 of a Measurement Report Frame contains the value of an absolute time reference at the time when the STA started measuring the first reported measurement and (2) at least one Measurement Report Element 405 500 is time-stamped 504. The Measurement Report Elements field 405 contains at least one Measurement Report Elements 500, as illustrated in FIG. 5A. The number of Measurement Report elements 500 and length of the Measurement Report Elements field 405 in a Measurement Report Frame 400 is limited by the maximum allowed medium access control (MAC) management protocol data unit (MMPDU) size.

Figure 5B:
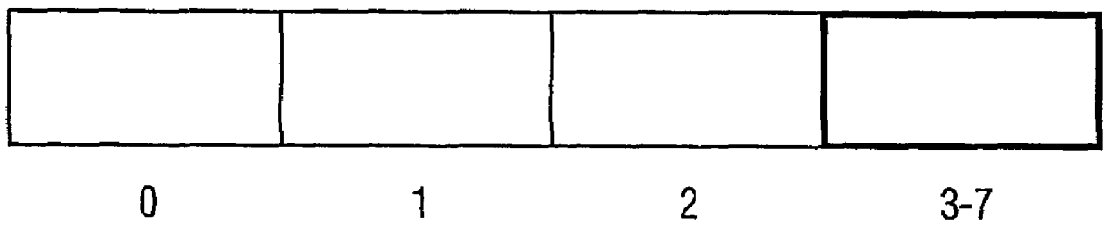
FIG. 5B illustrates a Measurement Report mode field of the Measurement Report Element illustrated in FIG. 5A, according to an embodiment of the present invention.

Each Measurement Report Element 500 contains a measurement report of a measurement made by a STA 201. The format of a Measurement Report Element 500 of a preferred embodiment is shown in FIG. 5B. The Element ID field 501 is set to an identifier assigned by a corresponding measurement request (e.g., according to IEEE 802.11 standard it is 39 for Measurement report.) The Length field 502 is variable and depends on the length of the Measurement Report field 507. The minimum value of the Length field is 3 (e.g., reporting a Measurement Mode equal to Incapable or Refused and using a zero-length Measurement Report field). The Measurement Token field 503 is set equal to the Measurement Token in the corresponding measurement request. If the Measurement Report element is being sent autonomously by a STA then the Measurement Token field 503 is set equal to zero. The Time Stamp field 504 is set to the value of an absolute timer when the requested measurement is started for each Measurement Element reported in a Measurement Report Frame 400, which is a TSF timer value for an IEEE 802.11 embodiment of the present invention. It should be noted that either or both Time-Stamp fields 404 and 504 can be present in a Measurement Report.

The inclusion of the actual time 504 of a Measurement Element 500 increases the confidence level of the measurement and when several STAs 201 report the same measurement at close but different time actual times 504, this confidence level is further enhanced. In addition, the frequency of transmitted and requested measurement reports helps guide STAs 201 in requesting and making measurement reports, e.g., if a report is received by a STA 201 at 1:00 and 1:05 the STA 201 can request or report measurements at 1:10 to obtain or provide, respectively, a reliable measurement of a given element(s).

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

The invention claimed is:

1. A method for creating a measurement report among a plurality of stations in a wireless local area network (WLAN), comprising the steps of:

receiving by a measurement capable station of said plurality of stations a measurement request for at least one measurement report element to be made at a given time;

recording by the measurement capable station said at least one measurement report element;

creating by the measurement capable station a measurement report comprising said at least one measurement report element as one of measurement report elements contained therein;

respectively time-stamping with an absolute time reference at least one of said at least one recorded measurement report element and said measurement report; and transmitting by the measurement capable station said created measurement report.

2. The method of claim 1, wherein said time-stamping step further comprises the step of setting by the measurement capable station each said absolute time reference to a time synchronization function (TSF) timer value.

3. The method of claim 1, further comprising the steps of:
if at least one measurement element has been time-stamped with an absolute time reference, determining by the measurement capable station an earliest said absolute time reference of a measurement report element, and setting by the measurement capable station said measurement report time-stamp to said determined earliest absolute time reference of a measurement report element.

4. The method of claim 3, wherein said time-stamping step further comprises the step of setting by the measurement capable station each said absolute time to a time synchronization function (TSF) timer value (306).

5. A method for creating an autonomous measurement report having at least one measurement report element, among a plurality of stations in a wireless local area network, comprising the steps of:
recording by a measurement capable station of said plurality of stations at least one pre-determined measurement report element;
optionally time-stamping with an absolute time reference by the measurement capable station said at least one recorded measurement report element;
creating by the measurement capable station an autonomous measurement report comprising said at least one measurement report element;
optionally time-stamping with an absolute time reference of the earliest time of a measurement report element contained therein said autonomous measurement report, and
transmitting by the measurement capable station said autonomous measurement report, wherein, at least one of said autonomous measurement report time-stamp and said at least one measurement report element time-stamp is included in said autonomous measurement report.

6. The method of claim 5, wherein each said time-stamping step further comprises the step of setting by the measurement capable station said absolute time-stamp to a time synchronization function (TSF) timer value.

7. A method for ensuring correctness of a time reference of a requested measurement among a plurality of stations (STAs) in a wireless local area network (WLAN), comprising the steps of:
transmitting by a first station a request for at least one time-stamped measurement report element to be performed at a given time;
receiving by a second station both the measurement request and a corresponding measurement report comprising the requested at least one measurement report element and at least one time-stamp comprising an absolute time reference of when the measurement recorded therein was done;
comparing by the second station the given time of the measurement request with the at least one time-stamp to determine correctness of the time-stamp.

8. The method of claim 7, wherein said receiving step further comprises the step of receiving a measurement report having each said Time Stamp set using a time synchronization function (TSF) timer value.

9. An apparatus configured for resource measurement among a plurality of stations in a wireless local area network (WLAN), comprising:
a receiver for receiving an incoming signal;
a measurement acquisition circuit that measures resources of said incoming signal received therein as at least one measurement report element;
a timer that provides an absolute time reference;
a control processor, coupled to said measurement acquisition circuit and said timer and beginning at a predetermined absolute time, configured to acquire at least one measurement report element of said incoming signal and optionally associate one of (1) an absolute time reference of the start of the first measurement reported within a measurement report as a time-stamp and (2) an absolute time reference of the start of each measurement report element reported therein with a measurement report element time-stamp.

10. The apparatus of claim 9, further comprising:
a memory, coupled to said control processor to store said obtained measurement report elements and optionally said associated measurement report element time-stamps; and wherein, said control processor is further configured to compare the predetermined absolute time with at least one said absolute time-stamp to determine correctness of said at least one absolute time-stamp.

11. The apparatus of claim 9, further comprising a receiver for receiving a measurement request comprising at least one measurement request element to be measured and reported as a measurement report element and the predetermined time to staff measuring.

12. The apparatus of claim 11, wherein said measurement request is transmitted by a station of said plurality of stations.

13. The apparatus of claim 11, wherein said measurement request is transmitted by an access point of said plurality of stations.

* * * * *